United States Patent
Teo et al.

(10) Patent No.: US 8,780,504 B1
(45) Date of Patent: Jul. 15, 2014

(54) DISK DRIVE HEAD SUSPENSION ASSEMBLY WITH LOAD BEAM INNER RAILS BETWEEN PIEZO ACTUATOR ELEMENTS

(71) Applicant: Western Digital Technologies, Inc., Irvine, CA (US)

(72) Inventors: Kia Moh Teo, San Jose, CA (US); Yih-Jen D. Chen, Pleasanton, CA (US); Tzong-Shii Pan, San Jose, CA (US); Wing C. Shum, San Mateo, CA (US); Yanning Liu, San Ramon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/917,654

(22) Filed: Jun. 14, 2013

Related U.S. Application Data

(60) Provisional application No. 61/812,665, filed on Apr. 16, 2013.

(51) Int. Cl.
*G11B 17/02* (2006.01)

(52) U.S. Cl.
USPC .................................................. 360/294.4

(58) Field of Classification Search
USPC ........... 360/99.08, 99.12, 99.16, 294.4, 294.3
See application file for complete search history.

(56) References Cited

U.S. PATENT DOCUMENTS

| | | | |
|---|---|---|---|
| 6,157,522 A | 12/2000 | Murphy et al. | |
| 6,188,548 B1 | 2/2001 | Khan et al. | |
| 6,215,629 B1 | 4/2001 | Kant et al. | |
| 6,233,124 B1 | 5/2001 | Budde et al. | |
| 6,239,953 B1 | 5/2001 | Mei | |
| 6,320,730 B1 | 11/2001 | Stefansky et al. | |
| 6,331,923 B1 | 12/2001 | Mei | |
| 6,335,848 B1 | 1/2002 | Mei | |
| 6,351,354 B1 | 2/2002 | Bonin | |
| 6,421,211 B1 | 7/2002 | Hawwa et al. | |
| 6,487,055 B1 | 11/2002 | Mei | |
| 6,512,659 B1 | 1/2003 | Hawwa et al. | |
| 6,661,619 B2 | 12/2003 | Nishida et al. | |
| 6,731,472 B2 | 5/2004 | Okamoto et al. | |
| 6,738,231 B2 | 5/2004 | Arya et al. | |
| 6,760,181 B2 * | 7/2004 | Li et al. | 360/75 |
| 6,760,196 B1 | 7/2004 | Niu et al. | |
| 6,807,030 B1 | 10/2004 | Hawwa et al. | |
| 6,927,945 B2 | 8/2005 | Yao et al. | |
| 6,930,860 B1 | 8/2005 | Coffey | |
| 6,952,330 B1 | 10/2005 | Riddering et al. | |
| 7,016,159 B1 | 3/2006 | Bjorstrom et al. | |
| 7,023,663 B2 | 4/2006 | Yao et al. | |
| 7,038,888 B2 | 5/2006 | Ma | |

(Continued)

*Primary Examiner* — Allen T Cao

(57) ABSTRACT

A head suspension assembly for a disk drive includes a load beam, and first and second piezoelectric elements that are disposed within first and second piezoelectric element receiving windows in a mounting plate, respectively. The load beam includes a plurality of rails that includes first and second outer rails and first and second inner rails, each of the plurality of rails being oriented in the longitudinal direction and being formed or bent out of the load beam plane. The first and second inner rails are disposed between the first and second piezoelectric elements, and the first and second outer rails are disposed not between the first and second piezoelectric elements. The first piezoelectric element is disposed between the first outer rail and the first inner rail, and the second piezoelectric element is disposed between the second inner rail and the second outer rail.

24 Claims, 6 Drawing Sheets

(56) References Cited

U.S. PATENT DOCUMENTS

| | | |
|---|---|---|
| 7,110,224 B2 | 9/2006 | Nakamura et al. |
| 7,159,300 B2 | 1/2007 | Yao et al. |
| 7,177,119 B1 | 2/2007 | Bennin et al. |
| 7,240,417 B2 | 7/2007 | Yao et al. |
| 7,280,319 B1 | 10/2007 | McNab |
| 7,292,413 B1 | 11/2007 | Coon |
| 7,312,956 B2 | 12/2007 | Yao et al. |
| 7,375,930 B2 | 5/2008 | Yang et al. |
| 7,417,831 B2 | 8/2008 | Yao et al. |
| 7,471,490 B2 | 12/2008 | Yao |
| 7,474,512 B2 | 1/2009 | Yao et al. |
| 7,535,680 B2 | 5/2009 | Yao et al. |
| 7,538,984 B2 | 5/2009 | Yao |
| 7,701,675 B2 | 4/2010 | Yao et al. |
| 7,813,083 B2 * | 10/2010 | Guo et al. .................. 360/245.9 |
| 8,149,545 B1 | 4/2012 | Chai et al. |
| 8,194,351 B2 | 6/2012 | Wright et al. |
| 8,446,694 B1 * | 5/2013 | Tian et al. ..................... 360/245 |
| 8,593,764 B1 * | 11/2013 | Tian et al. .................. 360/245.4 |
| 2008/0074794 A1 * | 3/2008 | Lee et al. ................... 360/245.3 |
| 2012/0268841 A1 * | 10/2012 | Hong et al. ..................... 360/75 |

* cited by examiner

DISK DRIVE HEAD SUSPENSION ASSEMBLY WITH LOAD BEAM INNER RAILS BETWEEN PIEZO ACTUATOR ELEMENTS

CROSS-REFERENCE TO RELATED APPLICATIONS

This application claims priority to provisional U.S. Patent Application Ser. No. 61/812,665, filed on Apr. 16, 2013, which is incorporated by reference herein in its entirety.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read may be referred to as "read heads" herein, regardless of other devices or functions that the read head may also include or perform (e.g. writing, flying height control, touch down detection, lapping control, etc).

In a modern magnetic hard disk drive device, each read head is a sub-component of a head gimbal assembly (HGA). The read head typically includes a slider and a read/write transducer. The read/write transducer typically comprises a magneto-resistive read element (e.g. so-called giant magneto-resistive read element, or a tunneling magneto-resistive read element), and an inductive write structure comprising a flat coil deposited by photolithography, and a yoke structure having pole tips that face a disk media.

The HGA typically also includes a head suspension assembly that includes a mounting plate, a load beam, and a laminated flexure to carry the electrical signals to and from the read head. The read head is typically bonded to a tongue feature of the laminated flexure. The HGA, in turn, is a sub-component of a head stack assembly (HSA) that typically includes a plurality of HGAs, a rotary actuator, and a flex cable. The mounting plate of each head suspension assembly is attached to an arm of the rotary actuator (e.g. by swaging), and each of the laminated flexures includes a flexure tail that is electrically connected to the HSA's flex cable (e.g. by solder reflow bonding or ultrasonic bonding).

Modern laminated flexures typically include electrically conductive copper traces that are isolated from a stainless steel support layer by a polyimide dielectric layer. So that the signals from/to the head can reach the flex cable on the actuator body, each HGA flexure includes a flexure tail that extends away from the head along the actuator arm and ultimately attaches to the flex cable adjacent the actuator body. That is, the flexure includes electrically conductive traces that are electrically connected to a plurality of electrically conductive bonding pads on the head (e.g. by solder jet bonding or gold ball bonding), and extend from adjacent the head to terminate at electrical connection points at the flexure tail.

The position of the HSA relative to the spinning disks in a disk drive, and therefore the position of the read heads relative to data tracks on the disks, is actively controlled by the rotary actuator which is typically driven by a voice coil motor (VCM). Specifically, electrical current passed through a coil of the VCM applies a torque to the rotary actuator, so that the read head can seek and follow desired data tracks on the spinning disk.

However, the industry trend towards increasing areal data density has necessitated substantial reduction in the spacing between data tracks on the disk. Also, disk drive performance requirements, especially requirements pertaining to the time required to access desired data, have not allowed the rotational speed of the disk to be reduced. In fact, for many disk drive applications, the rotational speed has been significantly increased. A consequence of these trends is that increased bandwidth is required for servo control of the read head position relative to data tracks on the spinning disk.

One solution that has been proposed in the art to increase disk drive servo bandwidth is dual-stage actuation. Under the dual-stage actuation concept, the rotary actuator that is driven by the VCM is employed as a coarse actuator (for large adjustments in the HSA position relative to the disk), while a so-called "milliactuator" having higher bandwidth but lesser stroke is used as a fine actuator (for smaller adjustments in the read head position). Various milliactuator designs have been proposed in the art for the purpose of dual-stage actuation in disk drive applications. Some of these designs utilize one or more piezoelectric milliactuators that are affixed to a component of the suspension assembly. For example, the piezoelectric milliactuator may be affixed to the mounting plate or an extension thereof, and/or the load beam or an extension thereof, or to the flexure tongue (a.k.a. the "gimbal tongue") to which the read head is bonded.

Generally, the further the milliactuator is disposed from the read head on the suspension assembly, the less bandwidth it can provide. This is due to the dynamics introduced by the intermediate structure of the suspension assembly. On the other hand, the closer the milliactuator is disposed to the read head on the suspension assembly, the lesser stroke it can typically provide.

However, when the milliactuator is affixed to the mounting plate and/or to the load beam, the advantage of increased stroke may also be partially negated by failures and reliability concerns associated with mechanical stresses. Such mechanical stresses may result from handling or process steps during HGA and/or disk drive manufacture, or may result from exposure of the disk drive to mechanical shocks after manufacture. For example, as disk drive designs get thinner or/and disk drive applications require robustness to more severe mechanical shocks, HGA piezoelectric elements are becoming prone to undesired cracking. Such cracks may go undetected in screening and get incorporated into finished manufactured drives. Over time, such cracks in the piezoelectric elements may grow, and create loose particles. This may degrade both the performance and the reliability of the manufactured disk drives.

Therefore, there is a need in the information storage device arts for suspension assembly design improvements that can relieve or isolate mechanical stresses to piezoelectric sub-components of a milliactuator, while still allowing an advantageous compromise between stroke and bandwidth for fine actuation of the read/write head.

DETAILED DESCRIPTION OF EXEMPLARY EMBODIMENTS

Figure 1:
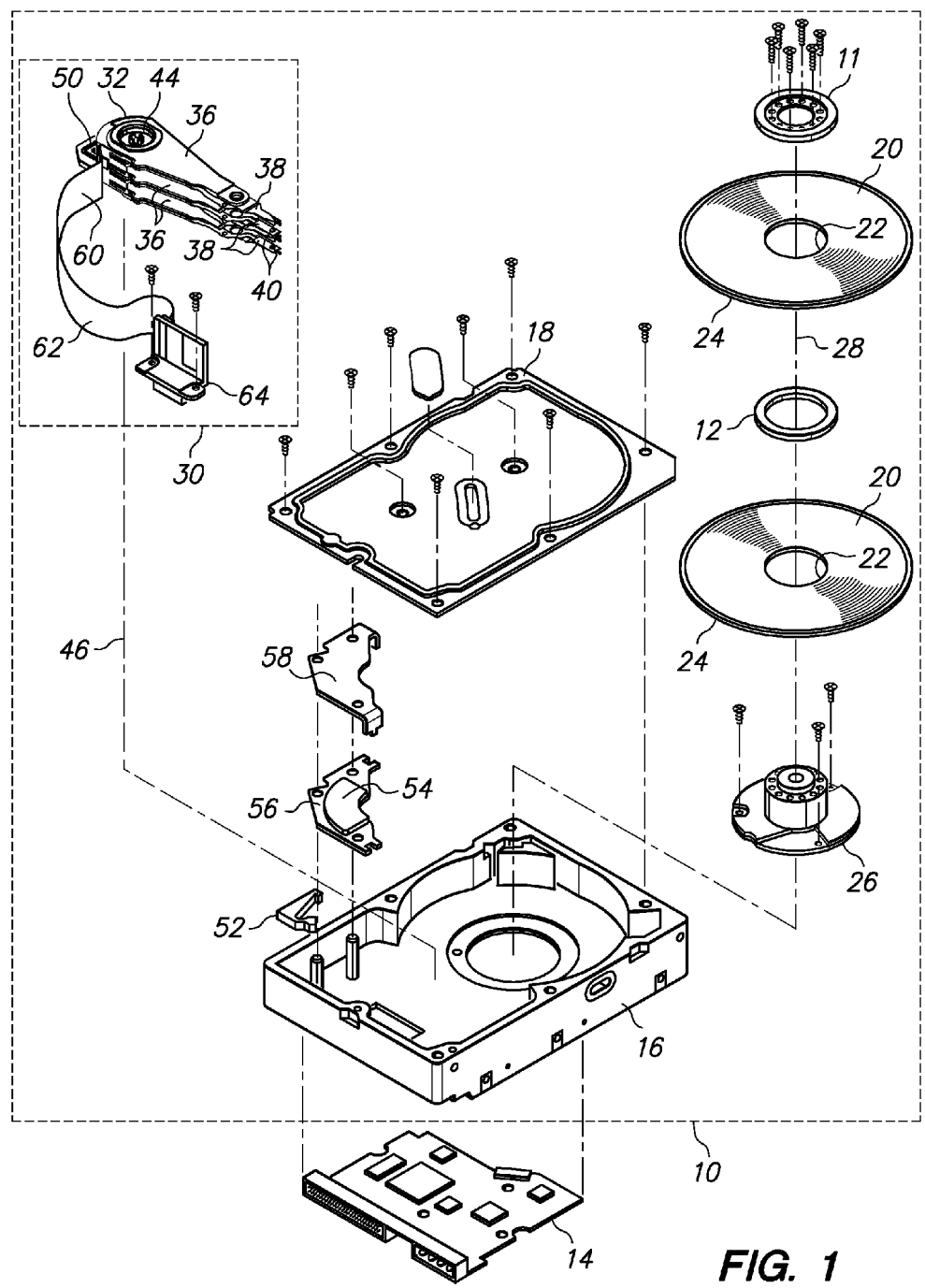
FIG. 1 is an exploded view of a disk drive that is capable of including an embodiment of the present invention.

FIG. 1 is an exploded perspective view of an example disk drive that is capable of including an embodiment of the present invention. The example disk drive includes a head disk assembly (HDA) 10 and a printed circuit board assembly (PCBA) 14. The HDA 10 includes a base 16 and cover 18 that together form a disk drive enclosure that houses at least one annular magnetic disk 20. Each disk 20 contains a plurality of magnetic tracks for storing data. The tracks are disposed upon opposing first and second disk surfaces of the disk 20 that extend between an inner disk edge 22 (corresponding to the inner diameter) and an outer disk edge 24 (corresponding to the outer diameter) of the disk 20. The head disk assembly 10 further includes a spindle motor 26 for rotating the disk 20 about a disk axis of rotation 28. The spindle motor 26 includes a spindle motor hub that is rotatably attached to the base 16 of the HDA 10. Disks 20 may be stacked and separated with one or more annular disk spacers 12 that are disposed about the hub, all held fixed to the hub by disk clamp 11.

In certain embodiments, the HDA 10 further includes a head stack assembly (HSA) 30 rotatably attached to the base 16 of HDA 10. The HSA 30 includes an actuator comprising an actuator body 32 and one or more actuator arms 36 extending from the actuator body 32. The actuator body 32 includes a bore and a pivot bearing cartridge 44 engaged within the bore for facilitating the HSA 30 to rotate relative to HDA 10 about actuator pivot axis 46. One or two head gimbal assemblies (HGA) 38 are attached to a distal end of each actuator arm 36. In certain embodiments, each HGA 38 includes a head (e.g. head 40) for reading and writing data from and to the disk 20, and a load beam to compliantly preload the head against the disk 20.

In the example of FIG. 1, the HSA 30 further includes a coil support that extends from one side of the HSA 30 that is opposite head 40. The coil support is configured to support a coil 50 through which a controlled electrical current is passed. The coil 50 interacts with one or more magnets 54 that are attached to base 16 via a yoke structure 56, 58 to form a voice coil motor for controllably rotating the HSA 30. HDA 10 includes a latch 52 rotatably mounted on base 16 to prevent undesired rotations of HSA 30.

In certain embodiments, the PCBA 14 includes a servo control system for generating servo control signals to control the current through the coil 50 and thereby position the HSA 30 relative to tracks disposed upon surfaces of disk 20. In certain embodiments, the HSA 30 is electrically connected to PCBA 14 via a flexible printed circuit (FPC) 60, which includes a flex cable 62 and a flex cable support bracket 64. The flex cable 62 supplies current to the coil 50 and carries signals between the HSA 30 and the PCBA 14.

In the magnetic hard disk drive of FIG. 1, the head 40 includes a body called a "slider" that carries a magnetic transducer on its trailing end (not visible given the scale of FIG. 1). The magnetic transducer may include an inductive write element and a magnetoresistive read element. During operation the transducer is separated from the magnetic disk by a very thin hydrodynamic air bearing. As the motor 26 rotates the magnetic disk 20, the hydrodynamic air bearing is formed between an air bearing surface of the slider of head 40, and a surface of the magnetic disk 20. The thickness of the air bearing at the location of the transducer is commonly referred to as "flying height."

Figure 2:
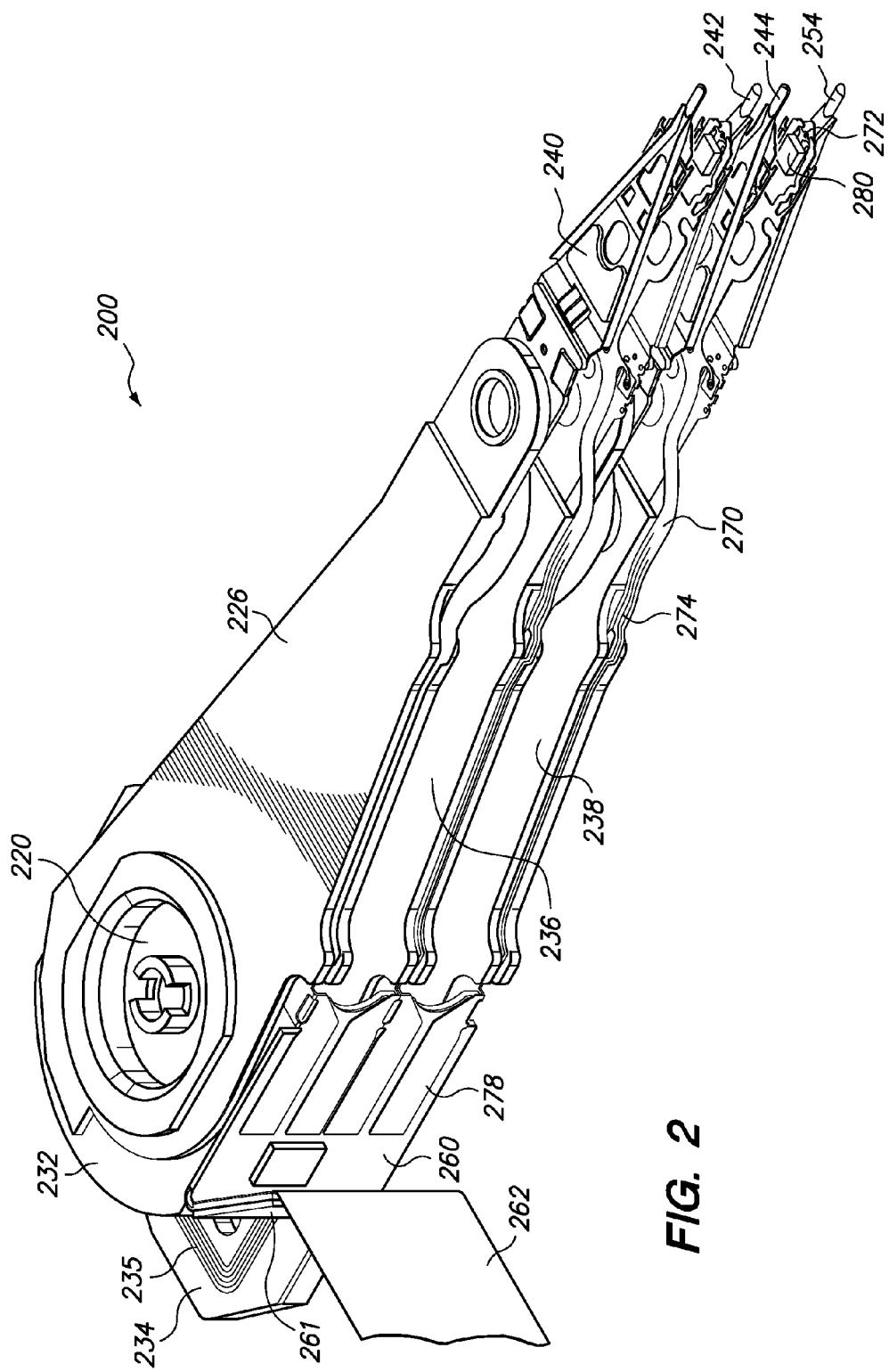
FIG. 2 is a perspective view of a head stack assembly (HSA) according to an embodiment of the present invention.

FIG. 2 is a perspective view of a head stack assembly (HSA) 200 according to an example embodiment of the present invention. The HSA 200 includes an actuator body 232 and a plurality of actuator arms 226, 236, 238 extending from the actuator body 232. The actuator body 232 may comprise aluminum, for example. The actuator body 232 may include a pivot bearing cartridge 220 disposed in the actuator bore, and a coil support 234 that supports a coil 235 and extends from the actuator body 232 in a direction that is generally opposite the actuator arms 226, 236, 238.

In the embodiment of FIG. 2, the HSA 200 also includes a plurality of head gimbal assemblies (HGA) 240, 242, 244, 254, attached to the actuator arms 226, 236, 238. For example, such attachment may be made by swaging. Note that the inner actuator arm 236 includes two HGAs, while each of the outer actuator arms 226, 238, includes only one HGA. This is because in a fully populated disk drive the inner arms are positioned between disk surfaces while the outer actuator arms are positioned over (or under) a single disk surface. In a depopulated disk drive, however, any of the actuator arms may have one or zero HGAs, optionally replaced by a dummy mass.

In certain embodiments, each HGA includes a head for reading and/or writing to an adjacent disk surface (e.g. HGA 254 includes head 280). The head 280 is attached to a tongue portion 272 of a laminated flexure 270. The laminated flexure 270 is part of the HGA 254, and is attached to a load beam subcomponent of the HGA 254. The laminated flexure 270 may include a structural layer (e.g. stainless steel), a dielectric layer (e.g. polymide), and a conductive layer into which traces are patterned (e.g. copper).

In the embodiment of FIG. 2, the HSA 200 also includes a laminar flexible printed circuit (FPC) 260 adjacent the actuator body 232, and the FPC 260 includes a flex cable 262. The FPC 260 may comprise a laminate that includes two or more conventional dielectric and conductive layer materials (e.g. one or more polymeric materials, copper, etc). The laminar FPC 260 may include a metallic stiffener 261 (e.g. aluminum). The laminated flexure 270 includes a flexure tail 274 that includes a terminal region 278 that is electrically connected to bond pads of the FPC 260.

Figure 3:
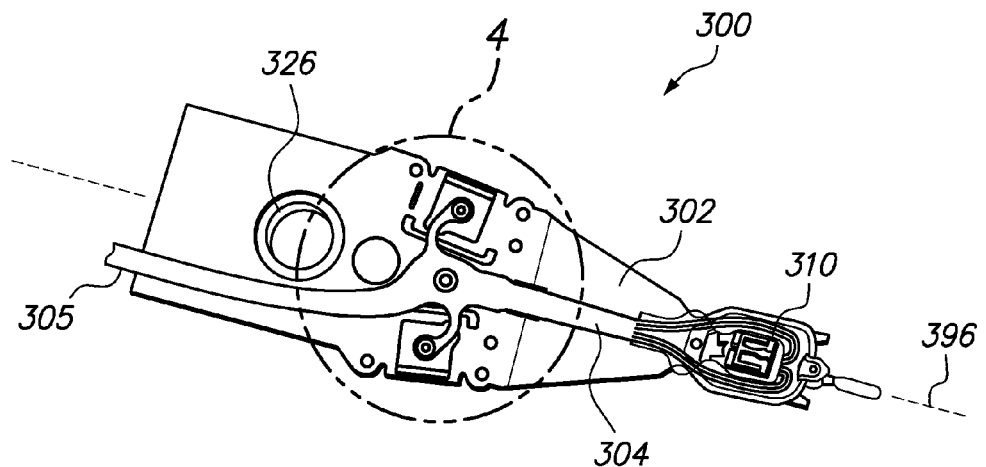
FIG. 3 is an underside view of a head gimbal assembly (HGA) according to an embodiment of the present invention.
Figure 4:
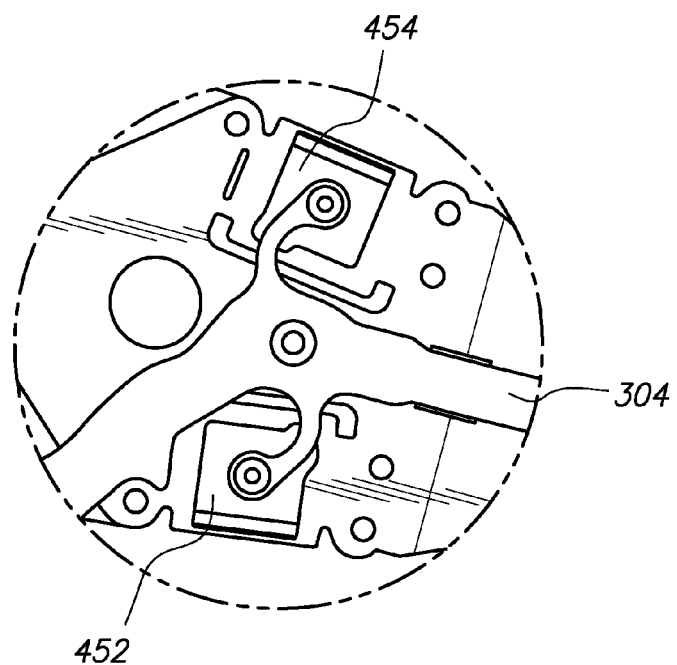
FIG. 4 depicts a portion of the suspension assembly of the HGA of FIG. 3.

FIG. 3 is a underside perspective view of a HGA 300 according to an embodiment of the present invention. FIG. 4 is an expanded view of the portion of the HGA 300 that is shown within a dashed circle in FIG. 3. Now referring additionally to FIGS. 3 and 4, the HGA 300 includes a mounting plate having a swage boss 326 that is used to attach the HGA 300 to an actuator arm (e.g. actuator arm 36 of FIG. 1). The HGA 300 also includes a load beam 302 attached to and extending from the mounting plate in a load beam longitudinal direction 396. The HGA 300 also includes a read head 310 bonded to a laminated flexure 304 that is supported by the load beam 302. The load beam 302 may be made of stainless steel, and the laminated flexure 304 may be attached to the load beam by spot welding or adhesive. The mounting plate, the load beam 302, and the laminated flexure 304 may together be referred to as a head "suspension assembly" that holds the read head 310.

In the embodiment of FIGS. 3 and 4, the read head 310 may read and write data from and to an adjacent surface of a magnetic disk (e.g. disk 20 of FIG. 1). The read head 310 may include a slider substrate having an air bearing surface (facing the viewer in FIG. 3) and an opposing top surface (not visible in the view of FIG. 3). The slider substrate preferably comprises AlTiC, although another ceramic or silicon might also be used. The read head 310 may also include a read/write transducer (too small to be seen in the scale of FIG. 3) that is preferably an inductive magnetic write transducer merged with a magneto-resistive read transducer (e.g. a tunneling magneto-resistive read transducer).

In the embodiment of FIGS. 3 and 4, the load beam 302 provides limited vertical compliance for the read head 310 to follow vertical undulations of the surface of a disk (e.g. disk 20 of FIG. 1) as it rotates. The load beam 302 also preloads the air bearing surface of the read head 310 against the disk surface by a preload force that is commonly referred to as the "gram load." In the embodiment of FIGS. 3 and 4, a first purpose of the laminated flexure 304 is to hold and provide compliance for the read head 310 to follow pitch and roll angular undulations of the surface of the disk (e.g. disk 20 of FIG. 1) as it rotates, while restricting relative motion between the read head 310 and the load beam 302 in the lateral direction and about a yaw axis.

A second purpose of the laminated flexure 304 may be to provide a plurality of electrical paths to facilitate signal transmission to/from the read head 310. For that second purpose, the laminated flexure 304 may include a plurality of electrically conductive traces that are defined in an electrically conductive (e.g. copper) sub-layer of the laminated flexure 304. Such electrically conductive traces may be insulated from a support layer (e.g. stainless steel) by a dielectric layer (e.g. polyimide). The electrically conductive traces may extend away from the read head 310 along a flexure tail 305 of the laminated flexure 304, to reach a portion of the flex cable (not shown) that includes a preamplifier chip near the body of the actuator (e.g. actuator 32 of FIG. 1).

In the embodiment of FIGS. 3 and 4, the suspension assembly of the HGA 300 also includes first and second piezoelectric elements 452, 454. These piezoelectric elements may optionally comprise one or more of many known piezoelectric materials, for example lead zirconate titanate, lead scandium tantalite, lanthanum gallium silicate, lithium tantalite, barium titanate, gallium phosphate and/or potassium sodium tartrate. Each of the first and second piezoelectric elements 452, 454 may optionally be a laminated piezoelectric element that comprises a plurality of layers of piezoelectric material disposed between pairs of a plurality of electrically conductive electrode layers (e.g. gold layers). For example, in a single layer configuration, the piezoelectric material of each of the first and second piezoelectric elements 452, 454 may be sandwiched between top and bottom gold electrode layers (e.g. gold) to facilitate applying an electric field of a desired voltage across the piezoelectric material.

As shown in the embodiment of FIGS. 3 and 4, the load beam 302 preferably includes through-openings over the first and second piezoelectric elements 452, 454, through which each of the first and second piezoelectric elements 452, 454 may be electrically connected to at least one of the plurality of conductive traces of the laminated flexure 304. The laminated flexure 304 also extends conductive traces to the read head 310. In certain embodiments, a conductive adhesive, solder, ribbon leads, and/or gold wire stitching may be used to make such electrical connections to the top or bottom electrode layers of the piezoelectric elements 452, 454. If solder is used, then it may be desirable for the solder to have a low temperature melting point, since it may be undesirable for it to get so hot that the piezoelectric material becomes depolarized.

Figure 5:
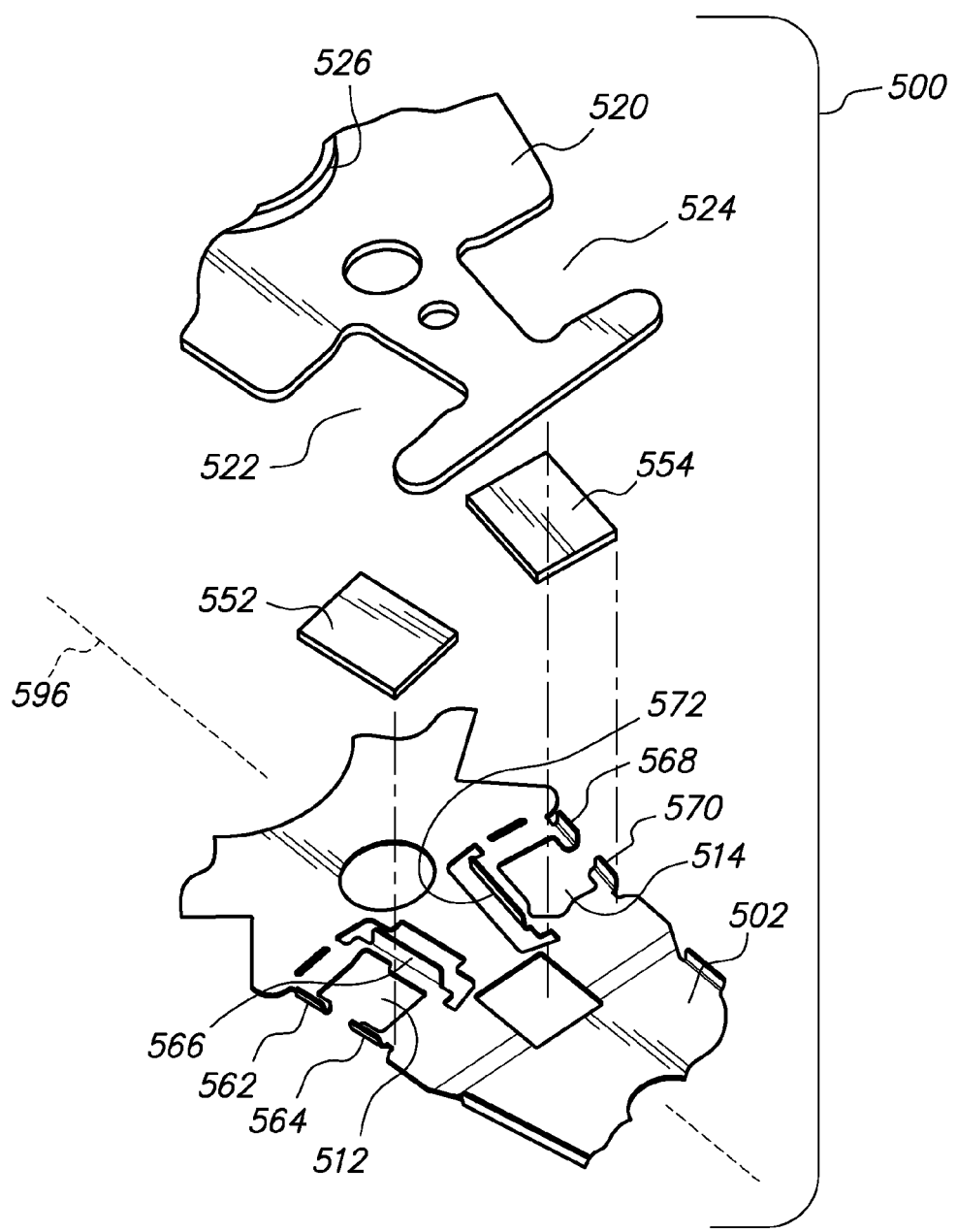
FIG. 5 is an exploded perspective view of a portion of a suspension assembly according to an embodiment of the present invention.
Figure 6:
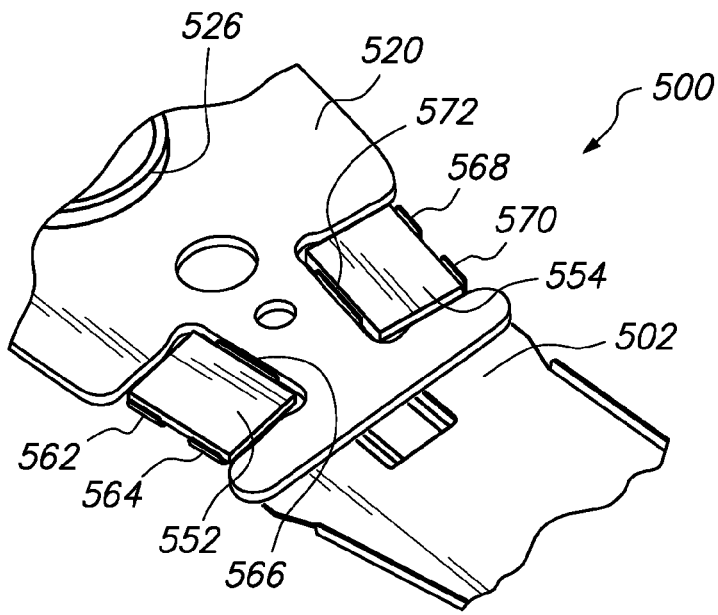
FIG. 6 is an assembled view of the portion of the suspension assembly of FIG. 5.

FIG. 5 is an exploded perspective view of a portion of a suspension assembly 500 according to an embodiment of the present invention. FIG. 6 shows the portion of the suspension assembly 500 assembled. In the embodiment of FIGS. 5 and 6, the suspension assembly includes a mounting plate 520 that may have an annular swage boss 526 to facilitate attachment of the suspension assembly 500 to an actuator arm (e.g. actuator arm 236 of FIG. 2) by the well-known conventional attachment process known as swaging. In that case, the mounting plate 520 may also be referred to as a "swage mounting plate," or "swage mount."

In the embodiment of FIGS. 5 and 6, a load beam 502 extends from the mounting plate 520 in a longitudinal direction 596. The load beam 502 and the mounting plate 520 may be made of stainless steel. For example, the load beam 502 may comprise stainless steel sheet metal having a thickness in the range of 20 microns to 103 microns. The load beam 502 is attached to the mounting plate 520, for example by spot welding, and the load beam 502 defines a load beam plane parallel to the mounting plate 520. In this context, "parallel" means practically parallel considering the imperfections of real components used in a practical manufacturing process, rather than meaning perfectly theoretically parallel, and so the load beam plane is considered to be "parallel" to the mounting plate 520 herein if it is within ±5° of being perfectly parallel.

In the embodiment of FIGS. 5 and 6, a first piezoelectric element 552 is disposed within a first piezoelectric element receiving window 522 in the mounting plate 520. A second piezoelectric element 554 is disposed within a second piezoelectric element receiving window 524 in the mounting plate 520. As shown in FIG. 5, the load beam 502 may also include through-openings 512, 514 through which each of the first and second piezoelectric elements 552, 554 may be electrically connected to conductive traces of a laminated flexure.

In the embodiment of FIGS. 5 and 6, the load beam 502 includes a plurality of rails 562, 564, 566, 568, 570, 572 adjacent the through-openings 512, 514. The plurality of rails 562, 564, 566, 568, 570, 572 includes a first outer rail 562, a second outer rail 568, a third outer rail 564, and a fourth outer rail 570. The plurality of rails 562, 564, 566, 568, 570, 572 also includes a first inner rail 566 and a second inner rail 572. As shown in FIG. 5, each of the plurality of rails 562, 564, 566, 568, 570, 572 is oriented in the longitudinal direction 596. In this context, recognizing that the load beam 502 is generally trapezoidal in shape rather than being perfectly rectangular, a rail in the load beam is considered to be "in the longitudinal direction" herein, if it is oriented within ±30° of perfect parallelism with the longitudinal direction 596.

Note that in the embodiment of FIGS. 5 and 6, each of the plurality of rails 562, 564, 566, 568, 570, 572 is also bent or formed out of the load beam plane by an angle in the range of 45 degrees to 90 degrees relative to the load beam plane. For example, in certain embodiments, each of the plurality of rails 562, 564, 566, 568, 570, 572 preferably defines a rail height (extending away from and measured normal to the load beam plane) that is at least 0.05 mm. In certain embodiments, the rail height is preferably but not necessarily greater than the nominal piezoelectric element thickness of the first and second piezoelectric elements 552, 554. For example, the piezoelectric element thickness may be in the range of 0.1 mm to 0.15 mm, with the rail height being preferably but not necessarily in the range of 0.12 to 0.30 mm. Such out of plane bending and ranges of rail height may give each rail a desired bending stiffness that is substantially greater than the surrounding load beam material, understanding that the bending moment of inertia of each rail is proportional to the cube of its height out of the load beam plane.

As shown in FIG. 6, the first and second inner rails 566, 572 are disposed between the first and second piezoelectric elements 552, 554, and the first and second outer rails 562, 568 are disposed not between the first and second piezoelectric element 552, 554. The first piezoelectric element 552 is disposed between the first outer rail 562 and the first inner rail 566, and the second piezoelectric element 554 is disposed between the second inner rail 572 and the second outer rail 568. In certain embodiments, this configuration of the plurality of rails may advantageously reduce the stress experienced by the first and second piezoelectric elements 552, 554, and thereby enhance disk drive reliability by delaying or avoiding fractures in the first and second piezoelectric elements 552, 554. In certain embodiments, this configuration may also advantageously enhance the stroke versus bandwidth tradeoff for fine actuation by the piezoelectric elements 552, 554, while acceptably meeting mechanical shock robustness requirements.

Figure 7:
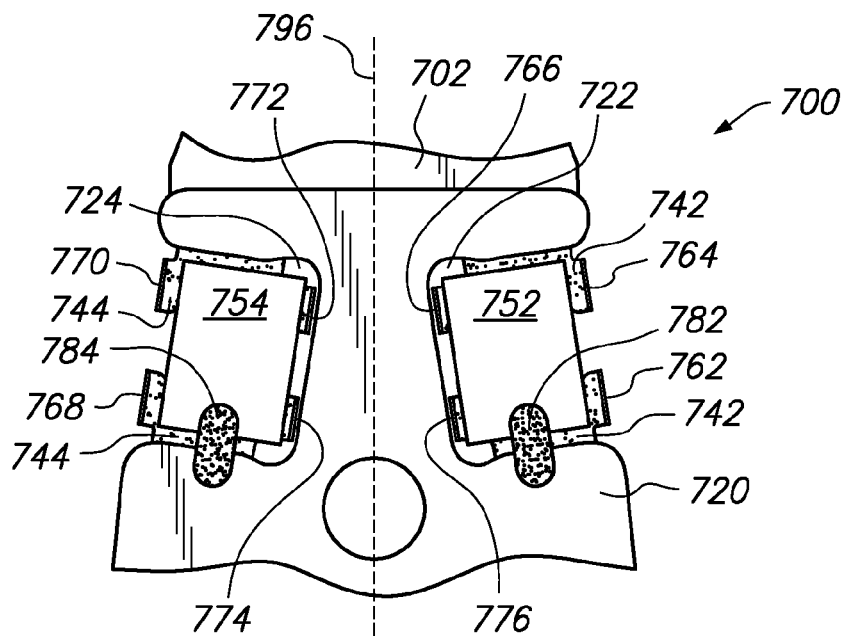
FIG. 7 depicts an assembled portion of a suspension assembly according to an embodiment of the present invention, after adhesives are applied.

FIG. 7 depicts an assembled portion of a suspension assembly 700 according to an embodiment of the present invention, after certain adhesives 742, 744, 782, and 784 have been applied. The suspension assembly 700 includes a mounting plate 720 and a load beam 702 that extends from the mounting plate 720 in a longitudinal direction 796. The load beam 702 is attached to the mounting plate 720, for example by spot welding, and the load beam 702 defines a load beam plane parallel to the mounting plate 720. In this context, "parallel" means practically parallel considering the imperfections of real components used in a practical manufacturing process, rather than meaning perfectly theoretically parallel, and so the load beam plane is considered to be "parallel" to the mounting plate 720 herein if it is within ±5° of being perfectly parallel.

In the embodiment of FIG. 7, a first piezoelectric element 752 is disposed within a first piezoelectric element receiving window 722 in the mounting plate 720. A second piezoelectric element 754 is disposed within a second piezoelectric element receiving window 724 in the mounting plate 720. As shown in FIG. 7, the load beam 702 includes a plurality of rails 762, 764, 766, 768, 770, 772, 774, 776 adjacent the piezoelectric elements 752, 754. The plurality of rails 762, 764, 766, 768, 770, 772, 774, 776 includes a first outer rail 762, a second outer rail 768, a third outer rail 764, and a fourth outer rail 770. The plurality of rails 762, 764, 766, 768, 770, 772, 774, 776 also includes a first inner rail 766 and a second inner rail 772, a third inner rail 774, and a fourth inner rail 776.

As shown in FIG. 7, each of the plurality of rails 762, 764, 766, 768, 770, 772, 774, 776 is oriented in the longitudinal direction 796. In this context, recognizing that the load beam 702 is generally trapezoidal in shape rather than being perfectly rectangular, a rail in the load beam is considered to be "in the longitudinal direction" herein, if it is oriented within ±30° of perfect parallelism with the longitudinal direction 796.

In the embodiment of FIG. 7, the first outer rail 762 and the first inner rail 766 extend into the first piezoelectric element receiving window 722 in the mounting plate 720, but not into the second piezoelectric element receiving window 724 in the mounting plate 720. Likewise, the second inner rail 772 and the second outer rail 768 extend into the second piezoelectric element receiving window 724 in the mounting plate 720, but not into the first piezoelectric element receiving window 722 in the mounting plate 720.

In certain embodiments, the first piezoelectric element 752 may be disposed adjacent to the first inner rail 766, and the second piezoelectric element 754 may be disposed adjacent to the second inner rail 772. For example, the first piezoelectric element 752 may be disposed within 150 microns of the first inner rail 766, and the second piezoelectric element 754 may be disposed within 150 microns of the second inner rail 772. As shown in FIG. 7, the first and second inner rails 766, 772 are disposed between the first and second piezoelectric elements 752, 754, and the first and second outer rails 762, 768 are disposed not between the first and second piezoelectric element 752, 754. The first piezoelectric element 752 is disposed between the first outer rail 762 and the first inner rail 766, and the second piezoelectric element 754 is disposed between the second inner rail 772 and the second outer rail 768.

In certain embodiments, the foregoing configuration of the plurality of rails may advantageously reduce the stress experienced by the first and second piezoelectric elements 752, 754, and thereby enhance disk drive reliability by delaying or avoiding fractures in the first and second piezoelectric elements 752, 754. In certain embodiments, this configuration may also advantageously enhance the stroke versus bandwidth tradeoff for fine actuation by the piezoelectric elements 752, 754, while acceptably meeting mechanical shock robustness requirements.

In the embodiment of FIG. 7, the first piezoelectric element 752 may optionally be rectangular in shape, with four edges that may be attached to the load beam by a non-conductive adhesive material 742. Likewise, the second piezoelectric element 754 may be attached to the load beam by a non-conductive adhesive material 744. In certain embodiments, the adhesive used to bond the first and second piezoelectric elements 752, 754 to the load beam 702 may be an electrically non-conductive cyanoacrylate, epoxy, polyimide, and/or acrylic adhesive. Non-conductivity of such adhesive may be advantageous in certain embodiments where electrode layers of the piezoelectric elements 752, 754 might otherwise be shorted. The head suspension assembly 700 may also include thinner and stronger adhesive bonds in peripheral overlap regions between the piezoelectric elements 752, 754 and the load beam 702, where an adhesive layer thickness (measured in or out of the page in the view of FIG. 7) may be preferably but not necessarily in the range of 0.01 mm to 0.03 mm.

In certain embodiments, a side of each of the piezoelectric elements 752, 754 may be grounded via electrical conduction to a metal (e.g. stainless steel) part of the suspension assembly such as the mounting plate 720 (used as the ground conductor rather than or in addition to a ground trace of a laminated flexure). For example, in the embodiment of FIG. 7, the first and second piezoelectric elements 752, 754 are grounded to the mounting plate 720 by first and second globs 782, 784 of electrically conductive adhesive (e.g. epoxy doped with silver particles), that serve as conductive jumpers.

Figure 8:
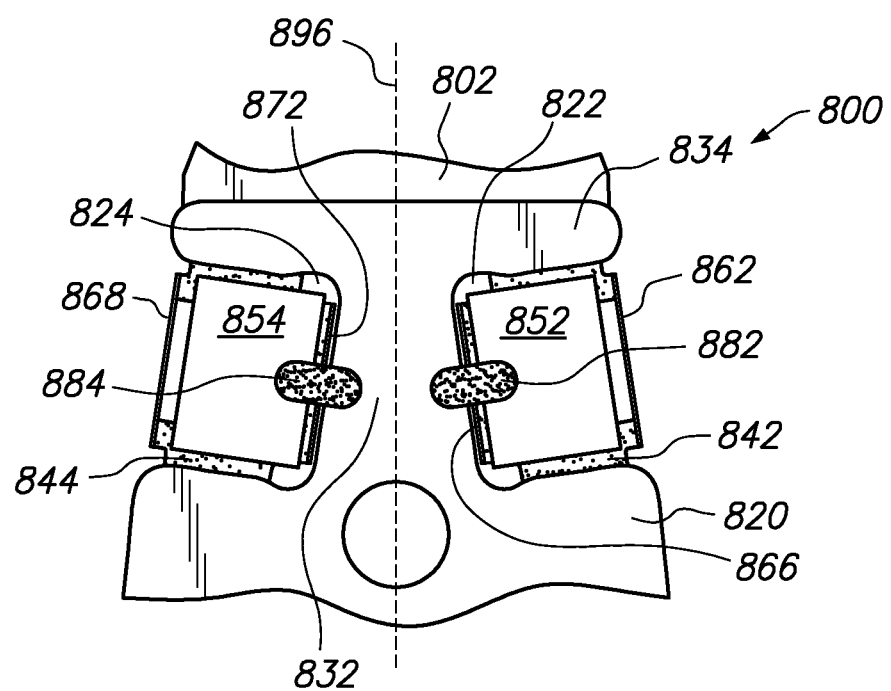
FIG. 8 depicts a portion of an assembled suspension assembly, with adhesive applied, according to another embodiment of the present invention.

FIG. 8 depicts an assembled portion of a suspension assembly 800 according to another embodiment of the present invention, after certain adhesives 842, 844, 882, and 884 have been applied. The suspension assembly 800 includes a mounting plate 820 and a load beam 802 that extends from the mounting plate 820 in a longitudinal direction 896. The load beam 802 is attached to the mounting plate 820, for example by spot welding, and the load beam 802 defines a load beam plane parallel to the mounting plate 820. In this context, "parallel" means practically parallel considering the imperfections of real components used in a practical manufacturing process, rather than meaning perfectly theoretically parallel, and so the load beam plane is considered to be "parallel" to the mounting plate 820 herein if it is within ±5° of being perfectly parallel.

In the embodiment of FIG. 8, a first piezoelectric element 852 is disposed within a first piezoelectric element receiving window 822 in the mounting plate 820. A second piezoelectric element 854 is disposed within a second piezoelectric element receiving window 824 in the mounting plate 820. As shown in FIG. 8, the load beam 802 includes a plurality of rails 862, 866, 868, 872 adjacent the piezoelectric elements 852, 854. The plurality of rails 862, 866, 868, 872 includes a first outer rail 862 and a second outer rail 868. The plurality of rails 862, 866, 868, 872 also includes a first inner rail 866 and a second inner rail 872. As shown in FIG. 8, each of the plurality of rails 862, 866, 868, 872 is oriented in the longitudinal direction 896. In this context, recognizing that the load beam 802 is generally trapezoidal in shape rather than being perfectly rectangular, a rail in the load beam is considered to be "in the longitudinal direction" herein, if it is oriented within ±30° of perfect parallelism with the longitudinal direction 896.

As shown in FIG. 8, the first and second inner rails 866, 872 are disposed between the first and second piezoelectric elements 852, 854, and the first and second outer rails 862, 868 are disposed not between the first and second piezoelectric element 852, 854. The first piezoelectric element 852 is disposed between the first outer rail 862 and the first inner rail 866, and the second piezoelectric element 854 is disposed between the second inner rail 872 and the second outer rail 868. In certain embodiments, this configuration of the plurality of rails may advantageously reduce the stress experienced by the first and second piezoelectric elements 852, 854, and thereby enhance disk drive reliability by delaying or avoiding fractures in the first and second piezoelectric elements 852, 854. In certain embodiments, this configuration may also advantageously enhance the stiffness, with acceptable stroke for fine actuation by the piezoelectric elements 852, 854, to acceptably meet mechanical shock robustness requirements.

In the embodiment of FIG. 8, each of the first and second piezoelectric element receiving windows 822, 824 in the mounting plate 820 has an open periphery, so that the mounting plate includes a substantially T-shaped distal portion 834 having a central longitudinally-oriented portion 832. In the embodiment of FIG. 8, the central longitudinally-oriented portion 832 of the mounting plate 820 is disposed between the first inner rail 866 and the second inner rail 872 of the load beam 802.

In the embodiment of FIG. 8, the second piezoelectric element 854 may optionally be rectangular in shape, with four edges that may be attached to the load beam by a non-conductive adhesive material 844. Likewise, the first piezoelectric element 852 may be attached to the load beam by a non-conductive adhesive material 842. In certain embodiments, a side of each of the piezoelectric elements 852, 854 may be grounded via electrical conduction to a metal (e.g. stainless steel) part of the suspension assembly such as the mounting plate 820. For example, in the embodiment of FIG. 8, the first and second piezoelectric elements 852, 854 are grounded to the mounting plate 820 by first and second globs 882, 884 of electrically conductive adhesive (e.g. epoxy doped with silver particles), that serve as conductive jumpers.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
  a disk drive base;
  a spindle attached to the disk drive base;
  a disk mounted on the spindle;
  a first actuator pivotally attached to the disk drive base, the first actuator including a conductive coil and an actuator arm; and
  a head suspension assembly comprising
    a mounting plate attached to the actuator arm;
    a load beam attached to and extending from the mounting plate in a longitudinal direction, the load beam defining a load beam plane parallel to the mounting plate;
    a first piezoelectric element disposed within a first piezoelectric element receiving window in the mounting plate; and
    a second piezoelectric element disposed within a second piezoelectric element receiving window in the mounting plate;
    wherein the load beam includes a plurality of rails that includes first and second outer rails and first and second inner rails, each of the plurality of rails being oriented in the longitudinal direction and being formed out of the load beam plane by an angle in the range of 45 degrees to 90 degrees relative to the load beam plane;
    wherein the first and second inner rails are disposed between the first and second piezoelectric elements, and the first and second outer rails are disposed not between the first and second piezoelectric elements; and
    wherein the first piezoelectric element is disposed between the first outer rail and the first inner rail, and the second piezoelectric element is disposed between the second inner rail and the second outer rail; and
  a read head supported by the load beam and disposed adjacent a surface of the disk.

2. The disk drive of claim 1 wherein the first outer rail and the first inner rail extend into the first piezoelectric element receiving window in the mounting plate, but not into the second piezoelectric element receiving window in the mounting plate.

3. The disk drive of claim 1 wherein the second inner rail and the second outer rail extend into the second piezoelectric element receiving window in the mounting plate, but not into the first piezoelectric element receiving window in the mounting plate.

4. The disk drive of claim 1 wherein the mounting plate includes an annular raised swage boss.

5. The disk drive of claim 1 wherein the load beam comprises stainless steel sheet metal having a thickness in the range of 20 microns to 103 microns.

6. The disk drive of claim 1 wherein each of the first and second piezoelectric element receiving windows in the mounting plate has an open periphery, so that the mounting plate includes a substantially T-shaped distal portion having a central longitudinally-oriented portion.

7. The disk drive of claim 6 wherein the central longitudinally-oriented portion of the mounting plate is disposed between the first and second inner rails of the load beam.

8. The disk drive of claim 1 wherein the first piezoelectric element is disposed within 150 microns of the first inner rail, and the second piezoelectric element is disposed within 150 microns of the second inner rail.

9. The disk drive of claim 8 wherein the first piezoelectric element is disposed adjacent to the first inner rail, and the second piezoelectric element is disposed adjacent to the second inner rail.

10. The disk drive of claim 1 wherein each of the plurality of rails defines a rail height extending away from the load beam plane, the rail height being at least 0.05 mm.

11. The disk drive of claim 10 wherein each of the first and second piezoelectric elements has a piezoelectric element thickness in the range of 0.1 mm to 0.15 mm, and the rail height is in the range of 0.12 to 0.30 mm.

12. The disk drive of claim 11 wherein each of the first and second piezoelectric elements is bonded to the load beam by an adhesive layer.

13. The disk drive of claim 12 wherein the adhesive layer has an adhesive layer thickness in the range of 0.01 mm to 0.03 mm.

14. The disk drive of claim 10 wherein the first and second piezoelectric elements define a nominal piezoelectric element thickness, and wherein the rail height is greater than the nominal piezoelectric element thickness.

15. A head suspension assembly comprising:
a mounting plate that includes an annular swage boss;
a load beam attached to and extending from the mounting plate in a longitudinal direction, the load beam defining a load beam plane parallel to the mounting plate;
a first piezoelectric element disposed within a first piezoelectric element receiving window in the mounting plate; and
a second piezoelectric element disposed within a second piezoelectric element receiving window in the mounting plate;
wherein the load beam includes a plurality of rails that includes first and second outer rails and first and second inner rails, each of the plurality of rails being oriented in the longitudinal direction and being formed out of the load beam plane by an angle in the range of 45 degrees to 90 degrees relative to the load beam plane;
wherein the first and second inner rails are disposed between the first and second piezoelectric elements, and the first and second outer rails are disposed not between the first and second piezoelectric elements; and
wherein the first piezoelectric element is disposed between the first outer rail and the first inner rail, and the second piezoelectric element is disposed between the second inner rail and the second outer rail.

16. The head suspension assembly of claim 15 wherein the first outer rail and the first inner rail extend into the first piezoelectric element receiving window in the mounting plate, but not into the second piezoelectric element receiving window in the mounting plate.

17. The head suspension assembly of claim 15 wherein the second inner rail and the second outer rail extend into the second piezoelectric element receiving window in the mounting plate, but not into the first piezoelectric element receiving window in the mounting plate.

18. The head suspension assembly of claim 15 wherein each of the first and second piezoelectric element receiving windows in the mounting plate has an open periphery, so that the mounting plate includes a substantially T-shaped distal portion having a central longitudinally-oriented portion.

19. The head suspension assembly of claim 18 wherein the central longitudinally-oriented portion of the mounting plate is disposed between the first and second inner rails of the load beam.

20. The head suspension assembly of claim 15 wherein the first piezoelectric element is disposed within 150 microns of the first inner rail, and the second piezoelectric element is disposed within 150 microns of the second inner rail.

21. The head suspension assembly of claim 20 wherein the first piezoelectric element is disposed adjacent to the first inner rail, and the second piezoelectric element is disposed adjacent to the second inner rail.

22. The head suspension assembly of claim 15 wherein each of the plurality of rails defines a rail height extending away from the load beam plane, the rail height being at least 0.05 mm.

23. The head suspension assembly of claim 22 wherein each of the first and second piezoelectric elements has a piezoelectric element thickness in the range of 0.1 mm to 0.15 mm, and the rail height is in the range of 0.12 to 0.30 mm.

24. The head suspension assembly of claim 22 wherein the first and second piezoelectric elements define a nominal piezoelectric element thickness, and wherein the rail height is greater than the nominal piezoelectric element thickness.

* * * * *